INVENTORS
REGINALD GRAHAM
JOHN KENNETH OXENHAM
BY
ATTORNEY

INVENTORS
REGINALD GRAHAM
JOHN KENNETH OXENHAM
BY
ATTORNEY

United States Patent Office 2,945,087
Patented July 12, 1960

2,945,087

INDEXING IN COLOUR TELEVISION RECEIVERS

Reginald Graham and John Kenneth Oxenham, both of 105–109 Judd St., London, England.

Filed Oct. 7, 1958, Ser. No. 765,757

7 Claims. (Cl. 178—5.4)

The present invention relates to indexing in colour television receivers of the type in which the screen upon which the television image is reproduced includes parallel stripes in repeating groups, the stripes in each group emitting (that is generating or transmitting) light of different colours and in which the screen is scanned in a raster of lines generally perpendicular to the stripes. Indexing means are required in order to ensure that the modulating signals which modulate the intensity of the scanning spot are maintained in correct phase relation to the movements of the scanning spot over the colour stripes.

In one form of receiver the screen of a cathode ray tube is provided with parallel stripes in repeating groups of three stripes, the stripes in each group emitting blue, green and red light respectively when bombarded by the cathode ray beam which is arranged to sweep over the stripes in a direction perpendicular to their length.

One indexing system for use in such a receiver makes use of secondary electron emission. One selected stripe in each group, say the green-emitting stripe, is given a different coefficient of secondary emission from the remainder of the screen surface or is associated with a stripe of material having a different coefficient of secondary emission from the remainder of the screen surface, with the result that each time the cathode ray beam sweeps over one of these selected stripes a pulse of current is generated both in a conducting coating of the screen and also in a secondary electron collecting electrode. Either of these pulses can be used for indexing purposes.

Another indexing system makes use of a photo-electric cell arranged to receive light from the stripes and rendered selectively responsive to light of one colour such as blue, for example by means of a suitable light filter. The pulses generated in the photo-electric cell when the beam sweeps over the selected stripes are used for indexing.

In the specification of British patent application No. 4,780/56 it is explained how modulation of the indexing signal by the luminance and chrominance signals occurs owing to the non-linear characteristic of the cathode ray tube and that such cross-modulation takes place even when a constant voltage carrier is used.

It has now been observed that a cross-modulation effect exists when a carrier is not used, even with a linear cathode ray tube. Thus the current $I_a$ in a linear tube can be expressed as $$I_a = g_0 + g_1[V_0 + V_1 \cos(\omega_1 t + \phi)] \quad (1)$$

where $g_0$ and $g_1$ are constants, $V_0$ is the luminance signal and represents the brightness of the picture, $V_1$ depends upon the colour saturation, $\phi$ represents the hue of the colour and $\omega_1$ is the angular index frequency.

The indexing function M can be expressed as a Fourier series $$M = m_0 + m_1 \cos \omega_1 t + m_2 \cos 2\omega_1 t + \ldots \quad (2)$$

where $m_0, m_1, m_2 \ldots$ are constants.

The index signal picked up from a photo-cell or from secondary emission is the product of (1) and (2) and since only the terms of frequency $\omega_1$ are of interest, the rest of the product can be omitted leaving the index signal $I\omega_1$ as $$I\omega_1 = m_0 g_1 V_1 \cos(\omega_1 t + \phi) + m_1(g_0 + g_1 V_0) \\ \cos \omega_1 t + (m_2 g_1 V_1/2) \cos(\omega_1 t - \phi) \quad (3)$$

From this it is seen that the index signal is dependent in phase on both the chrominance and the luminance of the received signal.

The present invention has for one of its objects to provide a receiving screen for colour television by means of which cross-modulation can be substantially reduced.

The invention has for another object to provide a colour television receiver in which cross-modulation is substantially reduced.

According to the present invention a receiving screen for colour television has parallel stripes arranged in repeating groups of $n$ stripes, the stripes in each group emitting light of different colours when impinged upon by a scanning beam, and index stripes disposed at uniform spacing parallel to the colour stripes, the spacing of index stripes being other than the spacing of said groups. The number of index stripes for every N groups will be referred to as $m$, where $m$ and N have no common factor.

The scanning beam may be a cathode ray beam and the colour stripes may be light filters transmitting light of the different colours or stripes of materials adapted to fluoresce with light of the different colours. The value of $n$ is usually three and the colours are usually red, green and blue. The index stripes may be of any material capable of yielding, when scanned by the beam, a signal which can be separated from the signals generated by scanning the colour stripes. For instance, the index stripes may emit light of a different colour from the colour stripes, for example ultra-violet light, or they may have a substantially greater coefficient of secondary electron-emission than the colour stripes and the remainder of the screen surface.

In order to ensure that the index signal derived from the index stripes is correctly phased in relation to the colour stripes the screen may be provided, outside the picture-reproducing area thereof, with further stripes at a spacing different from that of the index stripes and such that ambiguity of phase is avoided. The further stripes will be referred to as run-in stripes and they may for example be spaced apart by a distance which is $m/N$ times the spacing of the index stripes and be disposed parallel to the index stripes. Scanning of the run-in stripes then yields the index frequency $\omega_1$ directly.

According to one embodiment of the invention, the correct phasing is achieved by providing in addition to the aforesaid index stripes a further set of index stripes parallel to the first set, the spacing of the further index stripes being different from that of the first stripes.

The index stripes of the two sets may be distinguished from the colour stripes in different ways. This facilitates the separation of index signals derived from the two sets of index stripes without the need for electrical filter networks. The index stripes of the two sets may then overlap if desired.

In one form of the invention the index stripes of the two sets are arranged to be non-overlapping. The stripes of the two sets may then be distinguished from the rest of the screen in the same manner (e.g. both may be distinguished by secondary emission coefficient or by colour).

In one form of screen according to the invention the index stripes of the further set have the same spacing as the colour groups, whereby, in operation, they yield a signal of the index frequency $\omega_1$, and the index stripes of the other set have a different spacing from the colour groups and yield, in operation, a signal of frequency $M\omega_1/N$, where M and N are different integers.

When using these signals of frequency $\omega_1$ and $M\omega_1/N$ in order to derive the required index signal of frequency $\omega_1$, steps are taken to avoid cross-modulation of the index signal. According to one arrangement the signal of frequency $\omega_1$ derived from scanning one set of index stripes is made use of in generating the index signal from the signal of frequency $M\omega_1/N$ only at times when chrominance signals are not present. According to another arrangement gating signals of frequency $\omega_1$ are derived from the scanning of one set of index stripes and these signals are applied to gate signals of frequency $M\omega_1/N$ in such a manner as to generate from the latter the index signal of frequency $\omega_1$. The gating signals may be pulses of such width that the time-modulation thereof produced by the luminance and chrominance signals does not affect the phase of the index signal.

The invention will be described, by way of example, with reference to the accompanying drawings in which—

Figure 8:
Figs. 8 and 9 are much-enlarged diagrammatic representations in side and front view respectively of another screen according to the invention.

Referring first to Fig. 8, the screen comprises a transparent plate 10, for instance of glass, which may be the end wall of a cathode ray tube, having upon its surface colour stripes R, B and G representing red, blue and green respectively, separated by index stripes I. The stripes are thus in repeating groups each of six stripes, which may be referred to as a hexad.

Figure 2:
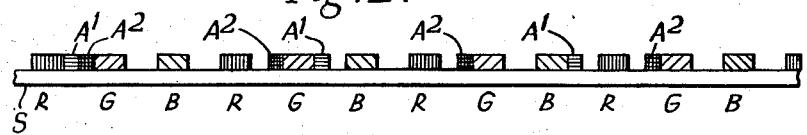
Fig. 2 is a view, similar to that of Fig. 1, of another form of screen according to the invention.

The index frequency $\omega_1$ is the frequency at which the hexads are scanned and it will be evident that scanning of the index stripes of Fig. 2 will yield a signal of frequency $3\omega_1$.

Figure 7:
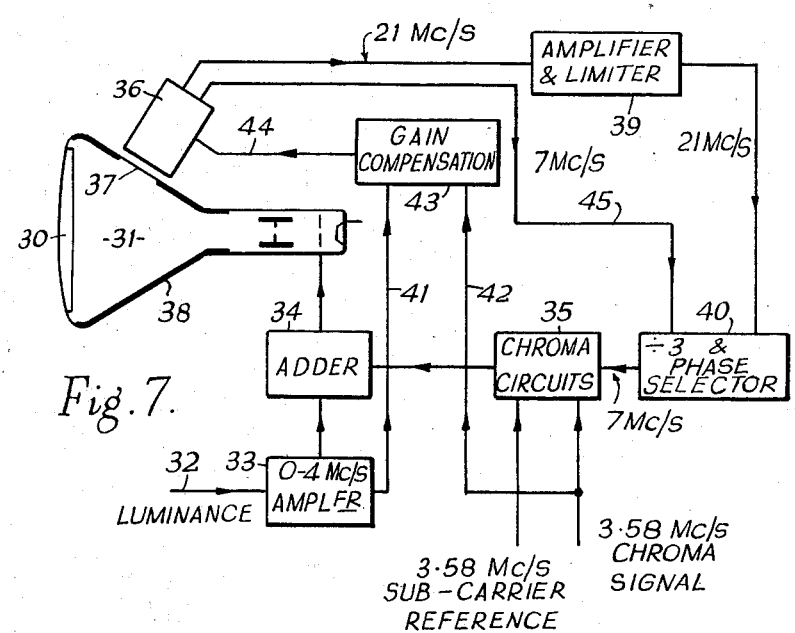
Fig. 7 is a simplified block circuit diagram of another form of receiver according to the invention also using photoelectric indexing.

Referring now to Fig. 7 there is shown a cathode ray tube 31 having a screen 30 of the character shown in Fig. 8. A received luminance signal is applied at 32 through an amplifier 33 having a band width of 0 to 4 mc./s. to an adder 34. A received chrominance signal at 3.58 mc./s. and a sub-carrier reference of the same frequency are applied to chroma circuits 35 together with an index signal from a divider and phase selector 40. The chrominance information is transferred to the index frequency and applied through the adder 34 to the intensity control electrode of the cathode ray tube.

A photo-multiplier 36 is arranged to receive light from the scanning of index stripes through a window 37 in a conducting coating 38 on the envelope of the tube 31.

The parts of the receiver so far described are conventional. The index signal will be assumed to be of 7 mc./s. and the signal generated in the photo-multiplier 36 will, therefore, have a fundamental frequency of 21 mc./s. which is fed to an amplifier and limiter 39. The output of the limiter is fed to a circuit 40 which divides the frequency by three producing an index signal of 7 mc./s. which is fed to the chroma circuits 35.

The amplifier 39 may have a band width of several mc./s. but should have considerable attenuation, say 40 db, at the sideband frequencies of 14 mc./s. and 28 mc./s.

The need for the amplitude limiting in 39 arises because the amplitude of the signal from the photo-multiplier 36 is, as will be shown hereinafter, a function of the luminance and chrominance amplitudes. Since the amplitude of the signal from 36 may vary by a factor of several hundreds to one, in order to simplify the amplitude limiting, signals derived at 41 from the luminance signal and at 42 from the chrominance signal may be applied to a gain compensation circuit 43 which generates a gain control voltage for application at 44 to the photo-multiplier 36. For example this voltage may be applied to one or more dynodes of the photo-multiplier. Alternatively, or in addition, it may be fed to the amplifier 39. The gain compensation voltage varies the gain of the system 36, 39 in sympathy with the variations in amplitude of the signal from 36 in such a manner as to reduce these variations. In this way an amplitude range of 500:1 may be compressed to a range of say 20:1 and the step of limiting in 39 is thereby considerably facilitated.

The frequency dividing circuit 40 may be constituted as described in "Waveforms" published in the Radiation Laboratories Series No. 19, page 562 et seq.

Figure 9:
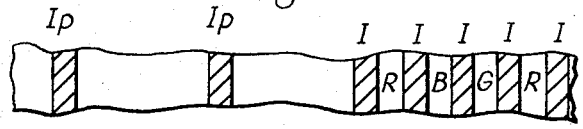

Although the index signal generated by this frequency division has the correct frequency, it may have any one of three phases and only one of these will give the correct colour reproduction. In order, therefore, to ensure that the output of the frequency divider starts in the correct phase at the beginning of each scanning line, the screen is in this example provided, outside the picture-reproducing area, with run-in stripes $I_p$ as shown in Fig. 9 which are at $m$, that is three times the spacing of the index stripes I. The 7 mc./s. signal derived from the scanning of these stripes $I_p$ is applied at 45 to the divider 40 to lock it in the correct phase.

It is not essential that the run-in stripes should be so spaced that they generate the frequency $\omega_1$. In general, if the frequency generated by the index stripes is $N\omega_1/n$ and that generated by the run-in stripes is $p\omega_1/q$, ambiguity can be avoided by suitable circuitry so long as N and p do not have a common factor.

As an example consider a system in which the index stripes have a frequency of $3\omega_1/4$. The divided output at the frequency $\omega_1$ can have three possible phases, say 0°, 120° and 240°, and the purpose of the run-in stripes is to reduce these three possibilities to one, say at 0°. Now if the run-in stripes were at a frequency of $6/7\omega_1$, this would not uniquely determine the starting phase, since the run-in stripes would give 6 possible phases, namely 0°, 60°, 120°, 180°, 240° and 300°, and it is obvious that three of these are the same as those produced by the $3\omega_1/4$ stripes.

If, however, the run-in stripes are at a frequency of say $2/3\omega_1$, then these stripes will give possible phases of 0° and 180°, so that in conjunction with the $3\omega_1/4$ stripes, the 0° phase would be uniquely determined.

It is, however, not always necessary to provide run-in stripes since if the screen is perfectly made the first of the index stripes scanned will produce an output which will determine the phase at which the divider 40 must divide. The disadvantage of having no run-in stripes is that if a part of the first index stripe is missing for any reason, then the circuit will act on the first index stripe that it "sees," which will be the second index stripe wherever the first is missing. The divider will then divide in the wrong phase. If there are several run-in stripes, the circuit constants can be so arranged that the signal at the run-in stripe frequency builds up more slowly in the correct phase, and errors will then not occur even if some parts of some of the run-in stripes are missing.

It can be shown that if the modulating electrode of the cathode ray tube is not driven below cut-off, and the tube has a square-law characteristic, the indexing signal current $I_{3\omega_1}$ from the photo-multiplier 36, so far as the terms of frequency $3\omega_1$ are concerned, is given by $$I_{3\omega_1} = K[V_0^2 + V_1^2/2] \cos 3\omega_1 t \quad \ldots \quad (4)$$

where K is a constant. Thus the amplitude of this current is a function of the luminance and chrominance amplitudes $V_0$ and $V_1$ but its phase is independent of these amplitudes. Hence, by limiting the amplitude of the $3\omega_1$ signal, cross-modulation can be avoided.

Even if the cathode ray tube modulator is driven below cut-off, or if the tube characteristic is not square-law, the cross-modulation can be made small. Thus, in this case, the tube current may be represented by $$I'_a = f_0 + f_1 \cos (\omega_1 t + \phi) + f_2 \cos (2\omega_1 t + 2\phi) + f_3 \cos (3\omega_1 t + 3\phi) + \ldots \quad (5)$$

where $f_0, f_1, f_3 \ldots$ are constants.

The index function M' for the screen shown in Figure 8 can be expressed as a Fourier series:

$$M' = m'_0 = + m'_3 \cos 3\omega_1 t + \ldots \quad (6)$$

From Equations 5 and 6 the component of index signal $I'_{3\omega_1}$ at frequency $3\omega_1$ is given by $$I'_{3\omega_1} = m'_3 f_0 \cos 3\omega_1 t + m'_0 f_3 \cos (3\omega_1 t + 3\phi) + \ldots \quad (7)$$

The second term of Equation 7 represents a cross-modulation term but if $m'_3 f_0$ is made much greater than $m'_0 f_3$ this term can be neglected. This can be achieved if the angle of conduction is not too small.

Figure 4:
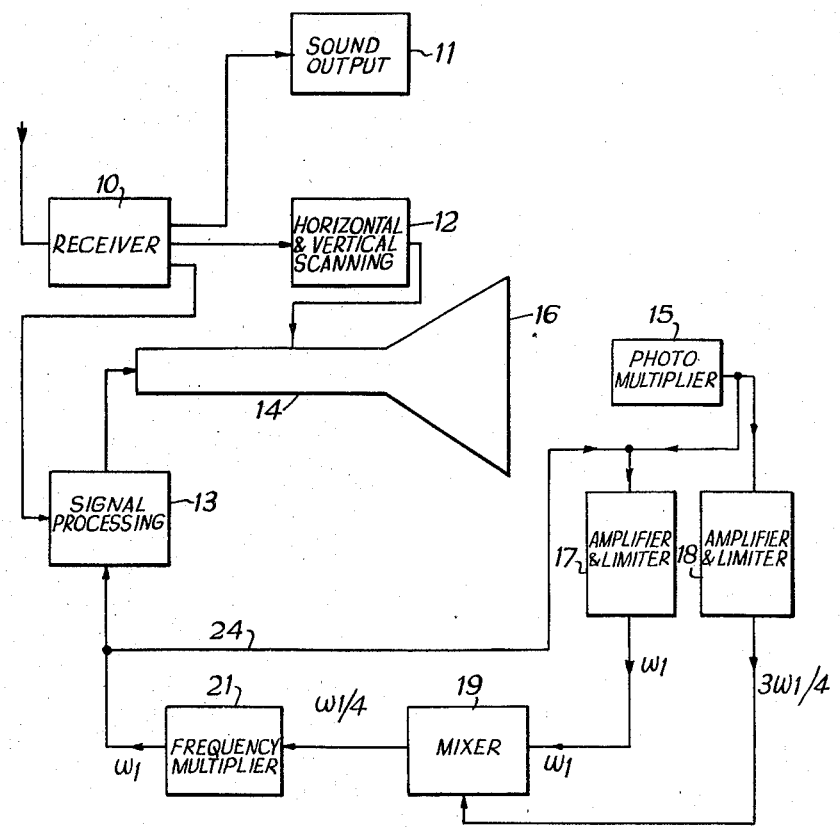
Figure 10:
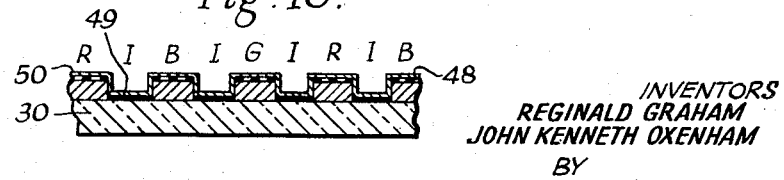
Figs. 10 to 15 are side views illustrating other different forms that the screen may take.

The screen according to the present invention may be made in a variety of different ways. One of these makes use of the method which is described in the specification of British patent application No. 25,583/57 and is illustrated in Fig. 4. With this form of screen the index signal is generated by secondary electron emission currents (as will for example be described with reference to Fig. 16) and not in a photo-multiplier as shown in Fig. 7. In Fig. 10, the colour phosphor stripes R, B, G are first applied to the transparent base 30, and a thin aluminium coating is then applied in such a manner that a continuous conducting layer 49 is provided in the spaces between the colour stripes whereas over the rough surfaces of the phosphors the aluminium 48 is discontinuous. The index stripes so formed are electrically connected together at one or both ends. A layer 50 of material of high secondary electron-emitting properties such as magnesium oxide is applied over the aluminium. When such a screen is scanned by a cathode ray beam, a substantially secondary electron emission takes place when the beam strikes an index stripe constituted by a magnesium oxide layer 50 over a highly conducting layer 49 of aluminium, the secondary electrons being collected by a suitable collector within the cathode ray tube. A relatively large nett current (which is the difference between the secondary and primary electron currents) then flows in a resistor connected between the conducting aluminium layer and a point of suitable fixed potential and also in a circuit connected to the collector. When, however, the beam strikes the magnesium oxide layer 50 lying over the insulating discontinuous aluminium coating 48 upon the colour stripes, the potential of the oxide layer quickly stabilises at a potential substantially equal to that of the collector, and consequently the nett current is very small.

Figure 11:
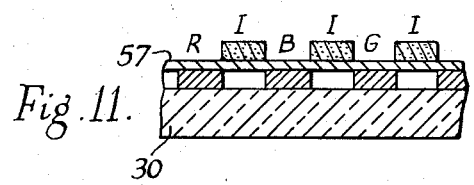

In the form of screen shown in Fig. 11, the phosphor stripes R, B, G are applied to a base 30 and the surface is then aluminised in the usual way to produce a continuous conducting coating 57. Upon this coating 57 are applied index phosphor stripes I. These stripes are, of course, on the side of the coating 57 nearer the electron gun. A suitable material for the index stripes is calcium aluminium silicate with cerium activator. This form of screen will also operate using the secondary emission principle if the index stripes I are made of a suitable secondary emission material instead of the index phosphor.

Figure 12:
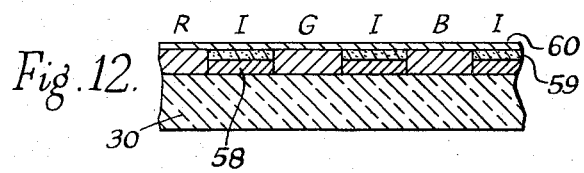

It is a somewhat difficult process to apply the stripes I over the fragile aluminium film 57, and the arrangement of Fig. 12 which is suitable for use with a photo-multiplier arrangement such as is shown in Fig. 7, avoids this difficulty. In Fig. 12, the colour stripes are applied as before and between these stripes are applied guard bands 58 of an opaque non-fluorescent material. Over these guard bands 58 are applied stripes 59 of a phosphor-emitting ultra-violet light. Such phosphors are described in "New Phosphors for Flying Spot Cathode Ray Tubes," published in Philips Research Reports 7, pages 421 to 431, 1952. Over the screen so formed is applied a film 60 of metal which is partially transparent to ultra-violet light, for instance silver or chromium. The film 60 may be omitted or may be replaced by a thin layer of magnesium oxide.

The guard bands 58 serve two purposes: they improve the colour rendition, and they also prevent the light from the index phosphor 28 from degrading the colorimetry of the picture.

The invention has so far been described for the simple case where the number of index stripes is equal to the number of colour stripes and where the index stripes are located between adjacent colour stripes. Other arrangements of stripes within the scope of the invention are shown in Figs. 13 to 15.

Figure 13:
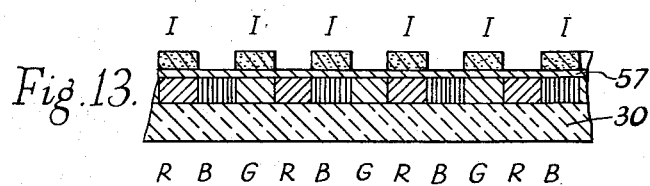

In Fig. 13, there are three index stripes I for every two groups of colour stripes: thus $N=2$ and $m=3$. It will be obvious that many other relationships within the scope of the invention are possible. Another convenient one is $N=4$ and $m=3$.

Figure 14:
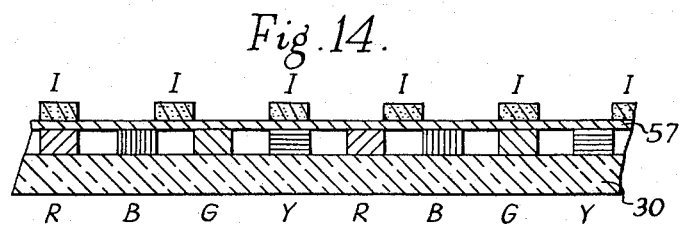

Fig. 14 exemplifies an arrangement using four different colour strips R, B, G and Y, $n$ therefore being 4, and in which $N=3$ and $m=8$. In Fig. 15 there are two colour stripes per group so that $n=2$, and $N=5$ while $m=8$.

Figure 15:
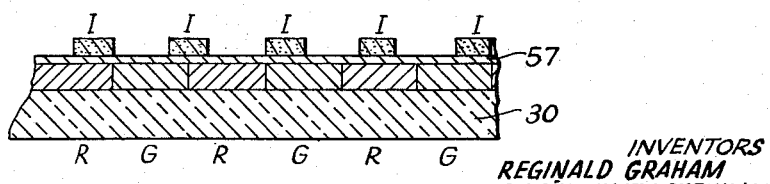

In Figs. 13, 14 and 15, index stripes lie over some of the colour stripes.

With the screen arrangement of Fig. 13 it is necessary that the divider and phase converter 40 of Fig. 7 should divided by 3/2, in that of Fig. 14 the device 40 divides by 8/3, and in that of Fig. 15 it divides by 8/5.

The spacing of the run-in stripes $I_p$ of Fig. 9 when using the arrangements of Figs. 13, 14 and 15 may be 3/2, 8/3 and 8/5 times, respectively, the spacing between the index stripes I.

Provided that the modulator of the tube is not driven beyond cut-off, the present invention enables cross-modulation to be avoided excepting for a negligible amount due to the variation in the size of the scanning spot with varying beam current.

The arrangements described have the further advantage that cross-contamination of the index signal by signals generated when the beam is impinging on the colour stripes is much less serious than with many known arrangements.

In British specification No. 4,780/56 reference is made to the necessity of preserving the phase angle of the index signal as this signal varies in frequency. A method of achieving this is described in United States patent specification No. 2,715,155 and may be made use of in the circuit of Fig. 7. In this way the stringent requirements of line time-base linearity can be relaxed.

Figure 1:
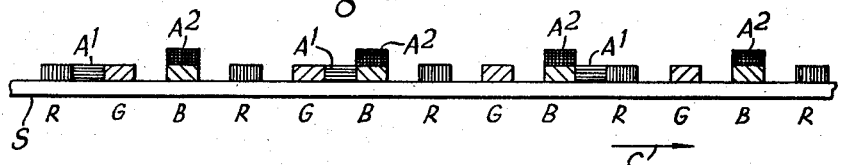
Fig. 1 is a diagrammatic and enlarged cross-sectional view of part of one form of screen according to the invention.

Referring now to Fig. 1, the screen includes a support S bearing stripes, extending perpendicular to the plane of the paper, of colours red, green and blue marked R, G and B respectively. Each fourth gap between colour stripes contains an index stripe $A_1$ and each blue stripe B has combined therewith a further index stripe $A_2$. When the stripes are scanned in the direction of the arrow C there will be generated from the stripes $A_1$ a frequency $3\omega_1/4$ and from the stripes $A_2$ a frequency $\omega_1$. The views in Figs. 1 and 2 are purely diagrammatic and the actual construction of the screen may be carried out in one of the ways hereinbefore described.

Since the index stripes of both sets $A_1$ and $A_2$ are distinguished from the rest of the screen in the same way, in this example by colour of light, it is arranged that there is not overlap between the index stripes of the two sets. Another way of arranging the stripes without overlap is shown in Fig. 2. Here it will be noted that stripes $A_1$ are always on the left of a gap between colour stripes and stripes $A_2$ are always on the right of a gap between colour stripes, the widths of the index stripes not exceeding half the width of a gap.

Under these circumstances it can be shown that the presence of the stripes $A_2$ does not result in any cross-modulation of the signal of frequency $3\omega_1/4$ generated from the stripes $A_1$. However, the signal derived from the stripes $A_2$ will be considerably cross-modulated by the luminance and chrominance signals and steps must be taken to avoid effect from this cause upon the index signal derived.

Figure 3:
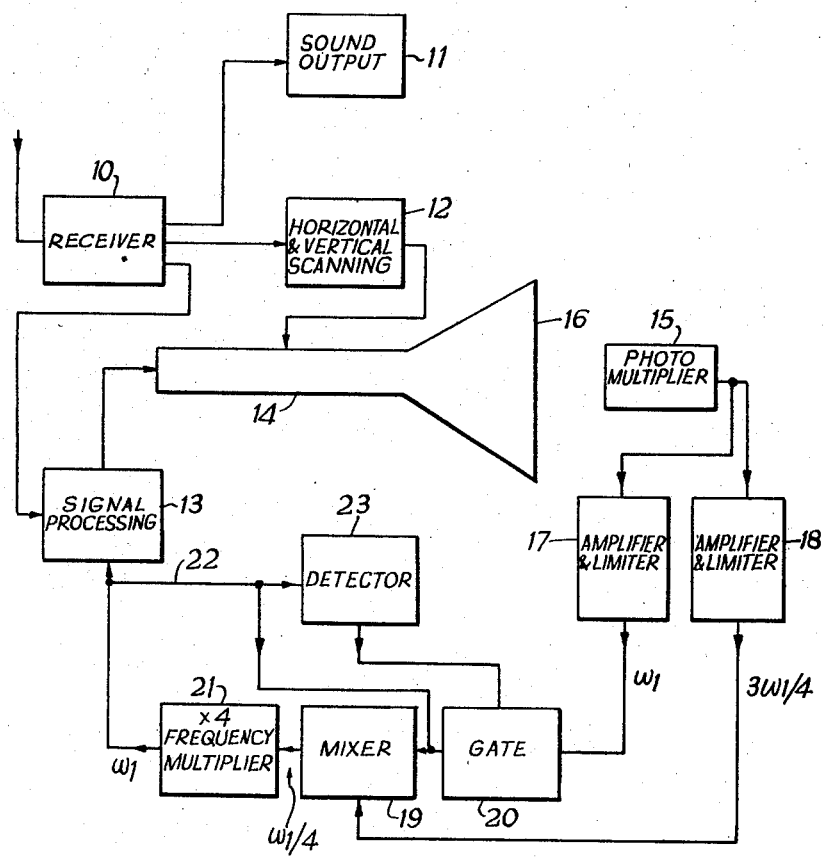
Figs. 3, 4 and 5 are block circuit diagrams of television receivers employing a screen as shown in Fig. 1 or 2, like parts in these figures having the same reference.

One suitable circuit is shown in Fig. 3. A receiver 10 feeds a sound output device 11, a horizontal and vertical scanning waveform generator 12, and a signal processing circuit 13 which feeds a modulating signal to modulate the intensity of the cathode ray beam in a tube 14. Scanning waveforms from 12 are also applied in well known manner to the tube 14.

A photo-multiplier 15 is shown in front of the screen 16 of the tube 14. In practice it would be disposed in known manner opposite a window in the graphite coating on the side wall of the tube in such a position as to receive light from the scanning of the index stripes on the screen 16.

Signals generated in the photo-multiplier 15 are fed to two amplifiers 17 and 18 each containing an amplitude limiter, the amplifier 17 selecting the frequency $\omega_1$ and the amplifier 18 selecting the frequency $3\omega_1/4$. The output of the amplifier 18 of frequency $3\omega_1/4$ is applied directly to a mixer 19, and the output of the amplifier 17 at a frequency $\omega_1$ is applied through a normally open gate 20 to the mixer 19. The output from the mixer 19 at a frequency $\omega_1/4$ is applied to a frequency multiplier 21 which multiplies by four. The output of the multiplier 21 is applied to the mixer 19 by a connection 22. The output of the multiplier 21 is detected at 23 and applied to close the gate 20.

The output of 21 is also applied to the signal processing circuits 13 which produce the luminance and chrominance signals which modulate the intensity of the scanning spot. These circuits are so arranged that no chrominance signal is produced until a signal is applied to 13 from 21.

During the line retrace intervals no luminance or chrominance signals are applied to the tube 14 from 13 and hence there will be no signals at the outputs of the amplifier-limiters 17, 18. There will therefore be no output from 21 applied to 13 and 23, the gate 20 will be open and the signal processing circuits will be incapable of producing a chrominance signal. When the line scan recommences, output signals will be obtained from 17, 18 which will be substantially free from cross-modulation since at the beginning of the line scan no chrominance signals are being applied to the tube 14. These output signals will be applied to the mixer 19 which will produce an output of frequency $\omega_1/4$ which will then be applied to the frequency multiplier 21. The output of 21 will be applied to the mixer 19, the phase response of the system being such that this output will be substantially in phase with the signal already being applied to 19 from 17 through 20. The output of 21 is detected by 23 to close the gate 20. The circuit then operates as hereinbefore described with reference to Fig. 7 and makes use of the output at $3\omega_1/4$ from the amplier limiter 18 to apply an index signal of frequency $\omega_1$ to the circuit 13. As the output of 21 is applied to the detector 23 and the signal processing circuit 13 simultaneously, the gate 20 is always closed when chrominance signals are being applied to the tube 14 from 13.

The sequence of operations described will occur at the end of each line retrace interval and the beginning of each line scan, the control of the index signal throughout the ensuing line scan being maintained by the signal from 18. The condition of no luminance or chrominance signal will also occur during a line scan during a black portion of the signal.

When, for any reason, the signal at the frequency $3\omega_1/4$ fails, there will be no output from 21 to hold the gate 20 closed, and the gate 20 will then open. When beam current again starts to flow, the circuit will resume operation as described.

In the circuit of Fig. 4, the gate 20 of Fig. 3 is dispensed with and the output of the multiplier 21 is applied to the mixer 19 through a connection 24 and the amplifier-limiter 17. The amplitude of the signal at frequency $\omega_1$ fed to amplifier 17 along 24 is arranged to be much greater than any signal at this frequency fed to 17 from the photo-multiplier 15 and, therefore, the output of the amplifier 17 is mainly dependent upon the signal from 21 when such a signal is present. During a line retrace interval, no signals are picked up by the photo-multiplier 15 and no index signal is applied to the circuit 13. At the beginning of a line scan, before the chrominance modulation for that line starts, signals are picked up by the photo-multiplier 15 and the loop 17, 18, 19, 21, 24 begins to operate. Before any cross-modulation of the signal output from 17 can occur, therefore, this output has become almost wholly dependent upon the output of the multiplier 21 which is substantially free from cross-modulation. When the luminance and chrominance signals cease, either at the end of a line scan, or on the occurrence of a black region in the picture, the loop becomes inoperative and is re-energised when signals from 15 again appear.

A further simplification of the circuit of Fig. 3 or 4 can be achieved by combining the early stages of the amplifiers 17, 18. This has the advantages that the bandwidth of the amplifier can be increased and consequently the time delay introduced thereby can be decreased, and the required amplification can be obtained with fewer valves.

Figure 6:
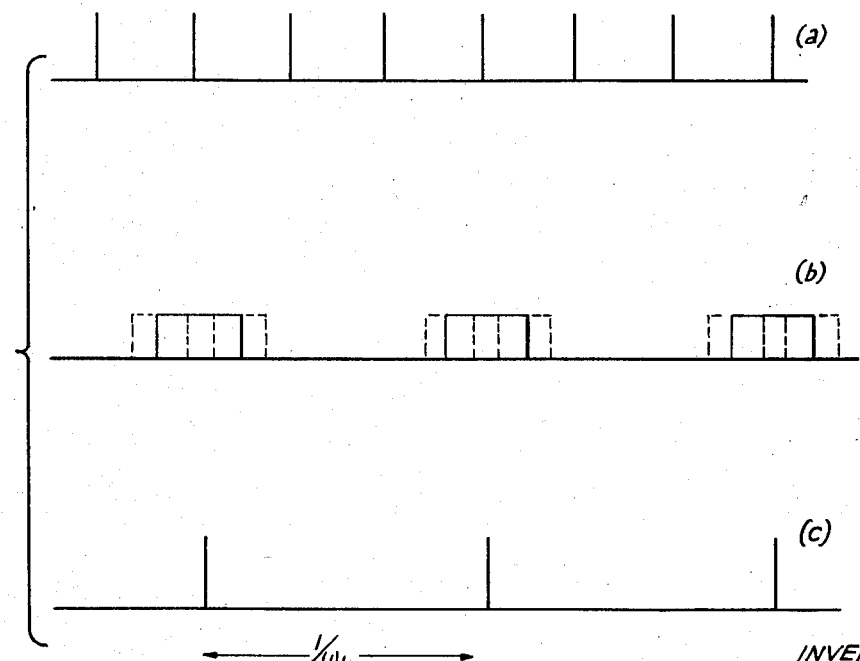
Fig. 6 is a waveform diagram illustrating the operation of Fig. 5.
Figure 5:
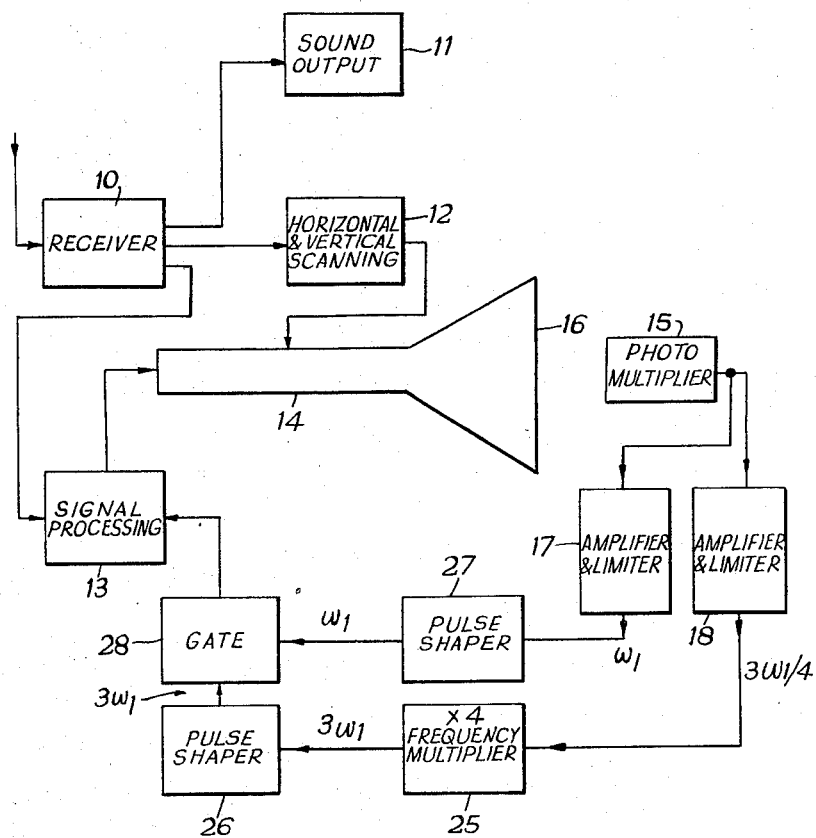

Referring now to Fig. 5, the signal of frequency $3\omega_1/4$ from the amplifier-limiter 18 is multiplied by four in a frequency-multiplier 25 to produce a signal of frequency $3\omega_1$ which is applied to a pulse shaper 26 which produces pulses of very short duration represented in Fig. 6(a).

The signal of frequency $\omega_1$ from the amplifier-limiter 17 is applied to a pulse shaper 27 which generates gating pulses as shown in full lines in Fig. 6(b). These gating pulses are applied to a gate 28 to open the gate for the passage of short pulses from 26. The pulses passed by the gate 28 and shown in Fig. 6(c) are index pulses of frequency $\omega_1$ and they are applied to the circuit 13. The dotted waveform in Fig. 6(b) indicates the extreme variations in phase of the gating pulses due to cross-modulation. It is arranged that the phase error in the signal from 17 due to cross-modulation is less than $\pm 60°$.

It will be seen that the phase of the index signal of Fig. 6(c) is entirely determined by the phase of the signal of Fig. 6(a), that is of the signal from 18 which is not subject to cross-modulation, the signal from 17 being employed merely to resolve phase ambiguity.

Instead of deriving both signals which co-operate in producing the index signal in the same manner, in the examples so far described by photo-index, each may be derived separately, for instance one by photo-index and the other by secondary emission. The signals may then be applied separately to the amplifiers 17, 18 and cross-talk between the two inputs can be avoided.

Another way of deriving the two signals separately is to use as the index stripes of the two sets short-decay phosphors with different emission bands. The two sets may then be distinguished by using two photo-cell filter combinations with suitably different spectral sensitivities.

When the index stripes of the two sets are capable of being distinguished in any of the ways described, or in any other way, it is not necessary to avoid overlap between stripes of the two sets.

In the examples given the frequencies of the outputs from 17 and 18 are $\omega_1$ and $3\omega_1/4$. In general the output from 18 may have any frequency represented by $M\omega_1/N$, when the output from 17 has a frequency $\omega_1/L$, where L, M and N are integers.

Although it is usually advantageous to arrange that the index stripes have the same spacing over the whole screen area, nevertheless, if desired, the circuits of Figs. 3 and 4 can be used with a screen in which only a few of the stripes $A_2$ are provided, say near the left edge of the screen when the scanning is from left to right. This is possible because the stripes $A_2$ are only used for a short time at the beginning of each line scan. It is, however, then necessary to ensure that the beam current never falls so low, during the line scan, that an adequate signal from 18 is not obtained.

The present invention makes use of two sets of uniformly spaced parallel index stripes, and hitherto it has been assumed that these are the only index stripes provided. This is, however, not necessarily the case.

For instance, referring to Fig. 1, one or two further $A_1$ stripes may be associated with each of the $A_1$ stripes shown. Thus the next one or two gaps between colour stripes to the right of the index stripes $A_1$ shown may be filled with further index stripes $A_1$. The same arrangement of index stripes can also be used with the indexing system described with reference to Fig. 7.

Similarly additional stripes of the $A_2$ type my be provided, for instance, in Fig. 1, by providing an additional $A_2$ stripe over each of the red phosphor stripes.

The signals generated at the outputs of the amplifiers 17 and 18 of Figs. 3, 4 or 5, will still be the same and it can be shown that cross-modulation is not affected by these additions.

Hitherto it has been assumed that the index signals are applied to control the modulating signals in order to ensure that the instantaneous positions of the scanning spot are correctly related to the modulating signals. It will be understood that the opposite arrangement can be used to effect the same purpose, that is to say the index signals may be used to control the scanning.

Although in the particular embodiments described with reference to Figs. 3, 4 and 5 the stripes $A_1$ have been so arranged as to give rise to a frequency $3\omega_1/4$, and the stripes $A_2$ to a frequency $\omega_1$, it will be understood that the arrangement of the stripes may be such that the former frequency has the value of $K\omega_1/N$ and the latter the value $\omega_1/L$ where K, N and L are any integers, K and N being different from one another.

Figure 16:
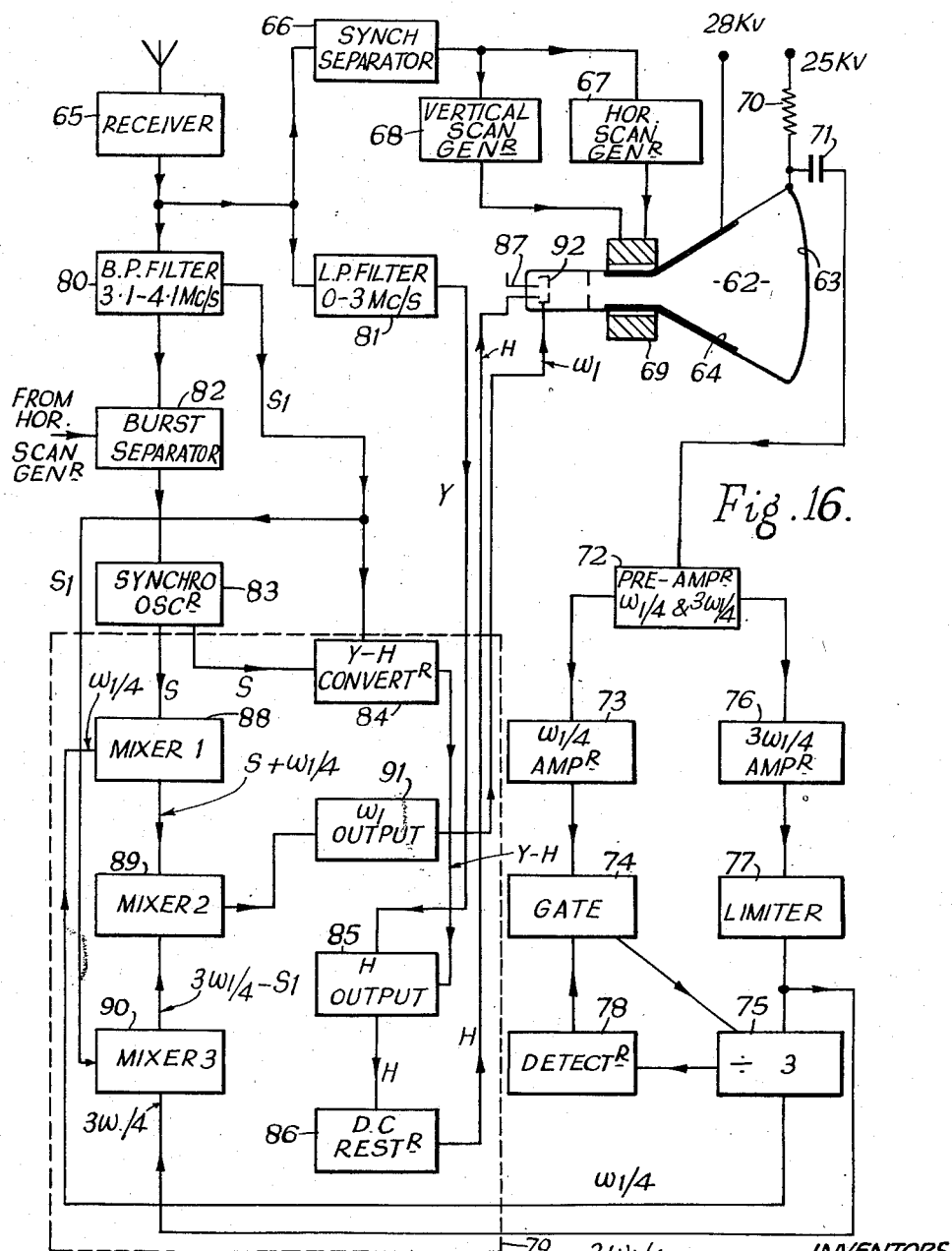
Fig. 16 is a block circuit diagram of another receiver according to the invention using secondary emission indexing.

The embodiment of Fig. 16 is one in which run-in stripes are provided in conjunction with one set of index stripes over the picture-reproducing area of the screen, the run-in stripes generating a frequency $\omega_1/4$ and the index stripes a frequency $3\omega_1/4$. In addition, Fig. 16 shows the use of secondary emission for providing the run-in and index signals.

The cathode ray tube 62 has a screen 63 which may have any of the forms described with reference to Figs. 8 to 15 with run-in stripes $I_p$ as shown in Fig. 9. A conducting coating 64 on the inside of the tube envelope maintained at a higher positive potential than the screen 63 serves to collect secondary electrons from the screen.

Signals from a receiver 65 are fed to a synchronising signal separator 66 which applies line and frame synchronising signals to horizontal and vertical scan generators 67 and 68 which in turn apply the line and frame scanning waveforms to deflecting coils 69.

When the cathode ray beam scans a run-in or an index stripe the resulting increase in secondary electron emission generates a voltage pulse across a resistor 70 connected between the screen 63 and a high voltage source.

These pulses are fed through a capacitor 71 to a preamplifier 72 which amplifies both the $\omega_1/4$ and the $3\omega_1/4$ frequencies. It is to be noted that when scanning the run-in stripes both frequencies will be generated, one as the fundamental and the other as a harmonic.

Signals at $\omega_1/4$ are fed through a selective amplifier 73 to a normally open gate 74. The output of the gate 74 is applied to a frequency divider 75. The $3\omega_1/4$ signal from 72 is applied through a selective amplifier 76 and an amplitude limiter 77 to the divider 75 which divides the $3\omega_1/4$ input by 3. The divider 75 is arranged to begin to divide only when signals from the gate 74 and signals from the limiter 77 are applied thereto simultaneously, but, once started, to continue dividing until the $3\omega_1/4$ signal ceases.

When a line scan starts, the scanning of the run-in stripes generates the frequencies $\omega_1/4$ and $3\omega_1/4$ and the divider 75 therefore begins at once to divide. An output from the divider is applied to a detector 78 the output of which is applied to close the gate 74. The $\omega_1/4$ signal is then suppressed and the divider 75 continues to divide the $3\omega_1/4$ signal only until the end of the line when this signal ceases. The output to the detector 78 then ceases and the gate 74 opens ready for the start of the next line scan.

The maintaining of the gate 74 closed throughout each line scan has the advantage that any spurious signal at $\omega_1/4$ generated during a line scan is prevented from affecting the divider 75. Such a spurious signal is, in fact, generated by the multiplicative action of the $\omega_1$ component of the beam current and the index structure at $3\omega_1/4$.

Within a dotted line rectangle 79 is shown a preferred form that the signal processing circuit, described with reference to Figs. 3 to 5, may take.

The output of the receiver 65 is applied to a band-pass filter 80 passing frequencies between 3.1 and 4.1 mc./s. and to a low-pass filter 81 passing frequencies from 0 to 3 mc./s. The output of the low-pass filter 81 is the luminance signal Y given by $$Y = .11B + .59G + .30R$$

where B, G and R represent blue, green and red respectively.

The output of the band-pass filter 80 is the 3.58 mc./s. chroma signal $S_1$ from which the reference burst is separated in a burst separator 82 fed in known manner with a signal derived from the horizontal scan generator 67. The reference bursts from 82 are applied to lock in phase and frequency a reference synchronised oscillator 83 generating the reference frequency S used to demodulate the chroma signal.

In order to improve the colour rendition it is necessary to change the video signal from Y to H, where H is given by $$H = R/3 + G/3 + B/3$$

and this can be done by subtracting a Y-H signal from the Y signal. The Y-H signal is obtained from a Y-H converter 84 which effects synchronous detection of the chroma signal $S_1$ at a phase angle of ±19° with a gain of .38. The Y-H output from 84 is applied to an H output stage 85 together with a Y signal from the low-pass filter 81, and the H signal from 85 is D.C. restored in 86 and applied to the cathode 87 of the tube 62.

The chroma information is transferred from the subcarrier to the writing frequency $\omega_1$ by means of three mixers 88, 89 and 90. The first mixer 88 mixes the reference frequency S at a suitable phase with the output from the divider 75 at $\omega_1/4$, and the output at a frequency $S + \omega_1/4$ is selected. The third mixer 90 mixes the chroma signal $S_1$ with the $3\omega_1/4$ signal from the limiter 77 and the output at $(3\omega_1/4) - S_1$ is selected. This signal is arranged to have the same amplitude and phase characteristics as $S_1$, that is to say the mixer 90 is linear with respect to the signal $S_1$.

The output from the mixers 89 and 90 are applied to the mixer 89 and the output at $\omega_1$ is selected. This output is arranged to have the same phase and amplitude characteristics as the input $(3\omega_1/4)-S_1$, i.e. the same as $S_1$. The output at $\omega_1$ is amplified in an output stage 91 and applied to the grid 92 of the tube 62.

The change of sign of the phase characteristic which occurs in the mixer 90 and which is preserved in the mixer 89 can be provided for by altering the colour stripe sequence, i.e. from R.G.B. to R.B.G.

We claim:

1. In a cathode ray tube, an image screen adapted to be scanned by an electron beam, said screen having a picture defining area on one surface thereof, a plurality of parallel spaced apart groups of color stripes on said area, each group containing N different stripes which emit light of different colors when scanned by said beam; a first set of indexing stripes on said area, said first set stripes being uniformly spaced at a spacing different from that of said groups; and a second set of indexing stripes on said area, said second set stripes being uniformly spaced at a spacing different from that of said first set stripes, the stripes in said first and second sets being parallel to said color stripes.

2. In a cathode ray tube, an image screen adapted to be scanned by an electron beam, said screen having a picture defining area on one surface thereof, a plurality of parallel spaced apart groups of color stripes on said area, each group containing N different stripes which emit light of different colors when scanned by said beam; a first set of indexing stripes on said area, said first set stripes being uniformly spaced at a spacing different from that of said groups; and a second set of indexing stripes on said area, said second set of stripes being uniformly spaced at a spacing different from that of said first set stripes, the stripes in said first and second sets being parallel to said color stripes, the first and second sets of stripes being non-overlapping.

3. In a cathode ray tube, an image screen adapted to be scanned by an electron beam, said screen having a picture defining area on one surface thereof, a plurality of parallel spaced apart groups of color stripes on said area, each group containing N different stripes which emit light of different colors when scanned by said beam; a first set of indexing stripes on said area, said first set stripes being uniformly spaced at a spacing different from that of said groups; and a second set of indexing stripes on said area, said second set stripes being uniformly spaced at a spacing different from that of said first set stripes, the stripes in said first and second sets being parallel to said color stripes, the spacing of one of said first and second sets of stripes being a non-integral multiple of the spacing of the other of said first and second sets of stripes.

4. In a cathode ray tube, an image screen adapted to be scanned by an electron beam, said screen having a picture defining area on one surface thereof, a plurality of parallel spaced apart groups of color stripes on said area, each group containing N different stripes which emit light of different colors when scanned by said beam; a first set of indexing stripes on said area, said first set stripes being uniformly spaced at a spacing different from that of said groups; a second set of indexing stripes on said area, said second set stripes being uniformly spaced at a spacing different from that of said first set stripes, the stripes in said first and second sets being parallel to said color stripes; and a third set of run in stripes uniformly spaced on said one surface in positions outside of said picture area, said third set stripes being parallel to said color stripes and having a spacing different from the spacings of said first and second sets of stripes.

5. In a cathode ray tube, an image screen adapted to be scanned by an electron beam, said screen having a picture defining area on one surface thereof, a plurality of parallel spaced apart groups of color stripes on said area, each group containing N different stripes which emit light of different colors when scanned by said beam; a first set of indexing stripes on said area, said first set stripes being uniformly spaced at a spacing different from that of said groups; a second set of indexing stripes on said area, said second set stripes being uniformly spaced at a spacing different from that of said first set stripes, the stripes in said first and second sets being parallel to said color stripes; and a third set of run in stripes uniformly spaced on said one surface in positions outside of said picture area, said third set stripes being parallel to said color stripes and having a spacing different from the spacing of said first and second sets of stripes, the spacing of said third set stripes being equal to that of said groups.

6. In a cathode ray tube, an image screen adapted to be scanned by an electron beam, said screen having a picture defining area on one surface thereof, a plurality of parallel spaced apart groups of color stripes on said area, each group containing N different stripes which emit light of different colors when scanned by said beam; a first set of indexing stripes on said area, said first set stripes being uniformly spaced at a spacing different from that of said groups; and a second set of indexing stripes on said area, said second set stripes being uniformly spaced at a spacing different from that of said first set stripes, the stripes in said first and second sets being parallel to said color stripes, the spacing of said first set stripes being equal to that of said groups.

7. A color television receiver for reproducing color television signals comprising a screen, parallel color stripes on a surface of said screen, said stripes being in repeating groups of N stripes, a first set of index stripes on said surface disposed parallel to said color stripes at uniform spacing, the spacing of said index stripes being different from the spacing of said groups, a second set of index stripes on said surface disposed parallel to said color stripes at a uniform spacing differing from that of said first set, means for generating a beam of radiant energy and directing said beam upon said surface, means for scanning said beam over said surface in a direction transverse with respect to said stripes, said color stripes of each group emitting light of different colors when impinged upon by said beam, means for modulating the intensity of said beam, means for applying said color television signal to said modulating means, said color television signal containing modulating components corresponding to different color which when said signal is in proper phase relation to said scanning correspond to the respective colors of said color stripes, generating means including a gate and responsive to the scanning of said index stripes to generate a control signal, said control signal including a first signal component generated by the scanning of said first index stripes and a second signal component generated by the scanning of said second index stripes, selective means separating said first and second signals, means for applying said first signal component to said gate, means for applying said second signal component to open said gating means for the passage therethrough of said first signal component, means for generating from said control signal an indexing signal having a frequency equal to that of scanning said groups, and means for applying said signal to control said phase relation.

References Cited in the file of this patent

UNITED STATES PATENTS 2,771,504    Moore et al.            Nov. 20, 1956
2,778,971    Sunstein              Jan. 22, 1957